(12) United States Patent
Haulsee

(10) Patent No.: US 10,697,518 B2
(45) Date of Patent: Jun. 30, 2020

(54) METHOD AND SYSTEM FOR CONVERTING ROTATING MOTION INTO LINEAR MOTION

(71) Applicant: STRAIGHT LINE DRIVE, INC., Claremont, VA (US)

(72) Inventor: Donald Haulsee, Claremont, VA (US)

(73) Assignee: DIRECTUS GROUP LLC, Claremont, VA (US)

( * ) Notice: Subject to any disclaimer, the term of this patent is extended or adjusted under 35 U.S.C. 154(b) by 0 days.

(21) Appl. No.: 15/607,347

(22) Filed: May 26, 2017

(65) Prior Publication Data

US 2018/0003267 A1 Jan. 4, 2018

Related U.S. Application Data

(60) Provisional application No. 62/342,844, filed on May 27, 2016.

(51) Int. Cl.
*F16H 1/28* (2006.01)
*B30B 1/26* (2006.01)
(Continued)

(52) U.S. Cl.
CPC .............. *F16H 1/28* (2013.01); *B30B 1/268* (2013.01); *B30B 15/007* (2013.01); *F16H 21/365* (2013.01)

(58) Field of Classification Search
CPC .......... F16H 1/28; F16H 21/36; F16H 37/124; F16H 37/126; F16H 21/365; B30B 1/02; B30B 1/14; B30B 1/26; B30B 15/0064
See application file for complete search history.

(56) References Cited

U.S. PATENT DOCUMENTS 587,380 A  *  8/1897  Ziegler ................... F16H 21/36
74/52
2,356,156 A  *  8/1944  Golber ...................... B41F 3/58
101/282
(Continued)

FOREIGN PATENT DOCUMENTS

CA       2881543 A1    3/2014
DE         35013       9/1885
(Continued)

OTHER PUBLICATIONS

PCT Search Report for PCT. App Ser. No. PCT/US17/34850, filed May 26, 2017, Now PCT Pat. App. Pub. No. WO 2017/205840.

*Primary Examiner* — Zakaria Elahmadi
(74) *Attorney, Agent, or Firm* — Smith Tempel; Steven P. Wigmore

(57) ABSTRACT

A system for transforming rotating motion into linear motion may include an output gear and an output link coupled to the output gear. A shared link may be coupled to the output link and coupled to a rod. An arm may be coupled to the shared link and to a rotating drive. An idle gear may be coupled to the output gear and to a stationary gear. Once rotation has started with the rotating drive, the output gear and idle gear may rotate around the stationary gear while the output link pivots and translates through space with the output gear. The shared link may drive the rod in a linear direction while receiving stabilizing supporting forces from the output link. The intermediate link may be coupled to the output link with a pin. The pin may also couple the intermediate link to the arm.

23 Claims, 14 Drawing Sheets

(51) Int. Cl.
*F16H 21/36* (2006.01)
*B30B 15/00* (2006.01)

(56) References Cited

U.S. PATENT DOCUMENTS

| | | | |
|---|---|---|---|
| 2,674,924 A | 4/1954 | Nielsen | |
| 2,909,070 A * | 10/1959 | Schuenemann | F16H 37/124 |
| | | | 101/282 |
| 2,922,646 A | 1/1960 | Buttner | |
| 3,221,419 A | 12/1965 | Cohen | |
| 3,524,419 A * | 8/1970 | Gibson | A01C 11/02 |
| | | | 111/100 |
| 3,538,607 A | 11/1970 | Montague | |
| 3,886,805 A * | 6/1975 | Koderman | F16H 21/365 |
| | | | 123/197.4 |
| 4,432,223 A | 2/1984 | Paquette et al. | |
| 4,433,951 A | 2/1984 | Koch et al. | |
| 4,516,512 A | 5/1985 | Bernstein et al. | |
| 4,996,865 A | 3/1991 | Haulsee et al. | |
| 5,419,572 A * | 5/1995 | Stiller | B62M 1/36 |
| | | | 280/252 |
| 5,465,648 A * | 11/1995 | Cy | F02B 41/00 |
| | | | 123/197.4 |
| 5,546,785 A * | 8/1996 | Platt | B21D 51/26 |
| | | | 100/282 |
| 6,240,794 B1 * | 6/2001 | Simon | F02B 75/32 |
| | | | 74/44 |
| 6,526,935 B2 * | 3/2003 | Shaw | F02B 75/32 |
| | | | 123/197.4 |
| 6,564,762 B2 * | 5/2003 | Dow | F02B 75/002 |
| | | | 123/197.4 |
| 6,910,701 B1 | 6/2005 | Long et al. | |
| 7,341,416 B1 | 3/2008 | Rubtsov | |
| 8,097,990 B2 | 1/2012 | Nair et al. | |
| 9,111,977 B2 * | 8/2015 | Coxon | H01L 21/67745 |
| 9,352,375 B2 * | 5/2016 | Haulsee | B21D 22/28 |
| 9,540,994 B2 * | 1/2017 | Haynes | F02B 75/32 |
| 9,958,041 B2 * | 5/2018 | Sanders | F02B 75/042 |
| 2003/0183026 A1 | 10/2003 | Korniyenko et al. | |
| 2006/0264294 A1 | 11/2006 | Summa et al. | |
| 2012/0251287 A1 * | 10/2012 | Fujimura | B25J 9/102 |
| | | | 414/749.1 |
| 2013/0014602 A1 * | 1/2013 | Villalobos | F16H 21/36 |
| | | | 74/52 |
| 2013/0216334 A1 | 8/2013 | An et al. | |
| 2014/0260500 A1 | 9/2014 | Fleischer et al. | |
| 2018/0043832 A1 * | 2/2018 | Okuyama | B60R 3/02 |

FOREIGN PATENT DOCUMENTS

| | | |
|---|---|---|
| GB | 1395058 A | 5/1975 |
| GB | 2234034 A | 1/1991 |
| JP | 3083439 B2 | 9/2000 |
| WO | 9325331 A1 | 12/1993 |
| WO | 2008061948 A1 | 5/2008 |
| WO | 2013104968 A1 | 7/2013 |

* cited by examiner

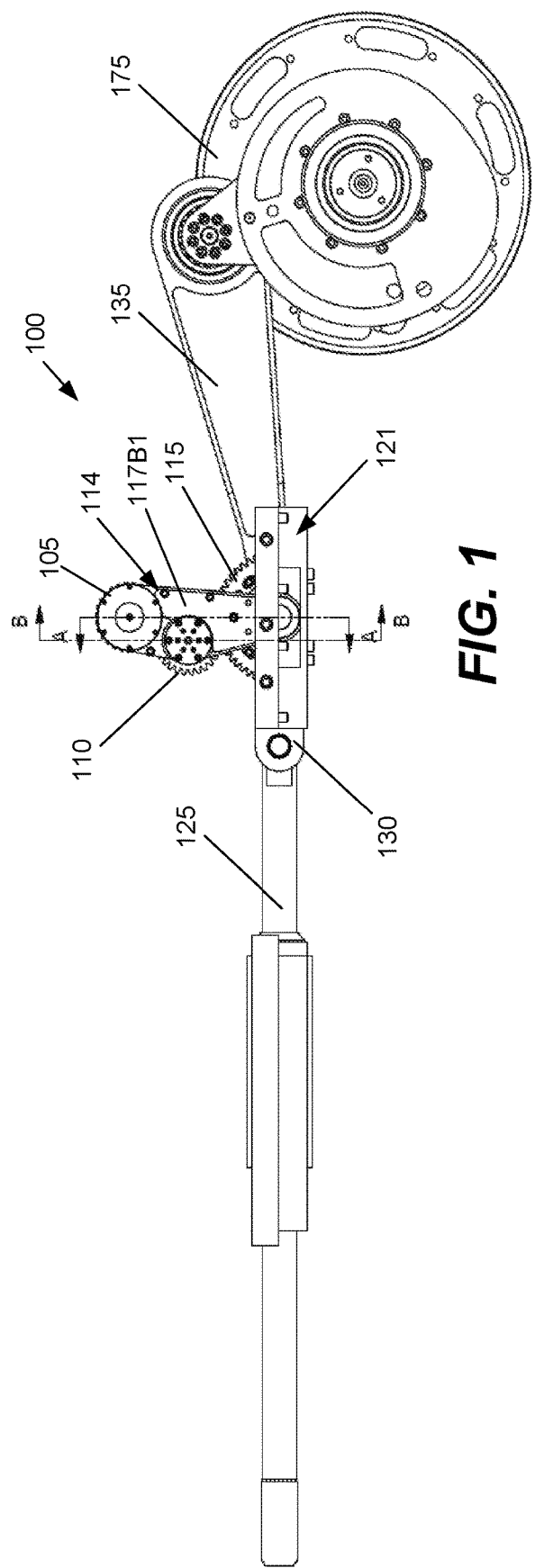
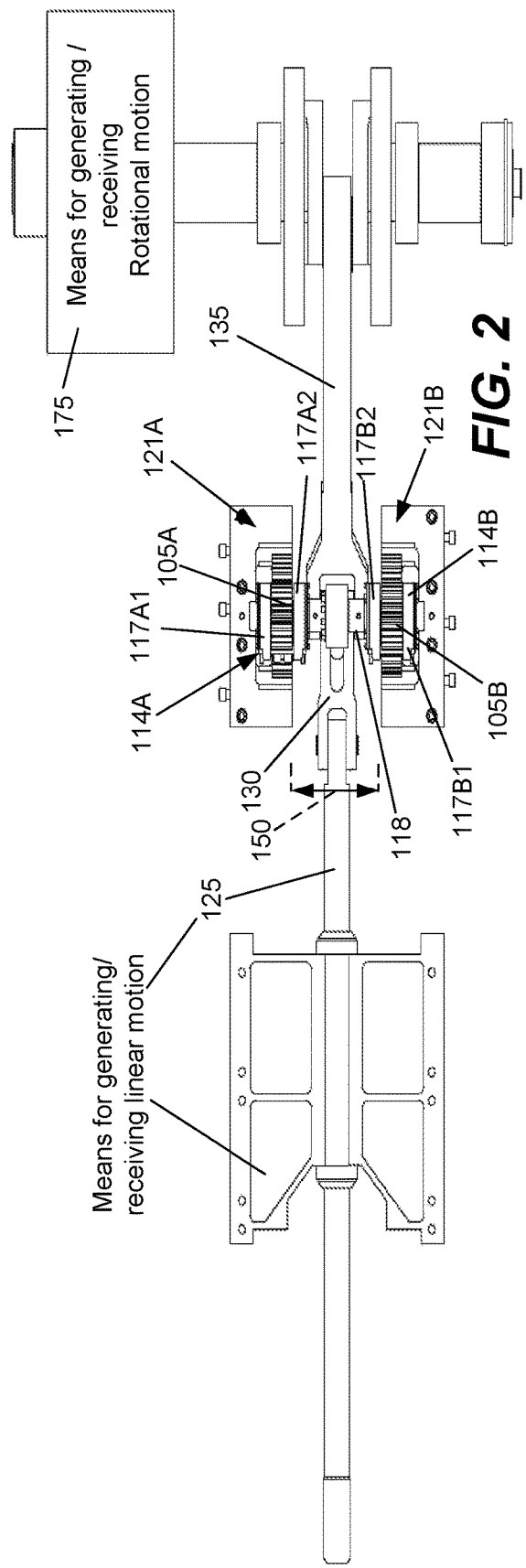
FIG. 1
FIG. 2

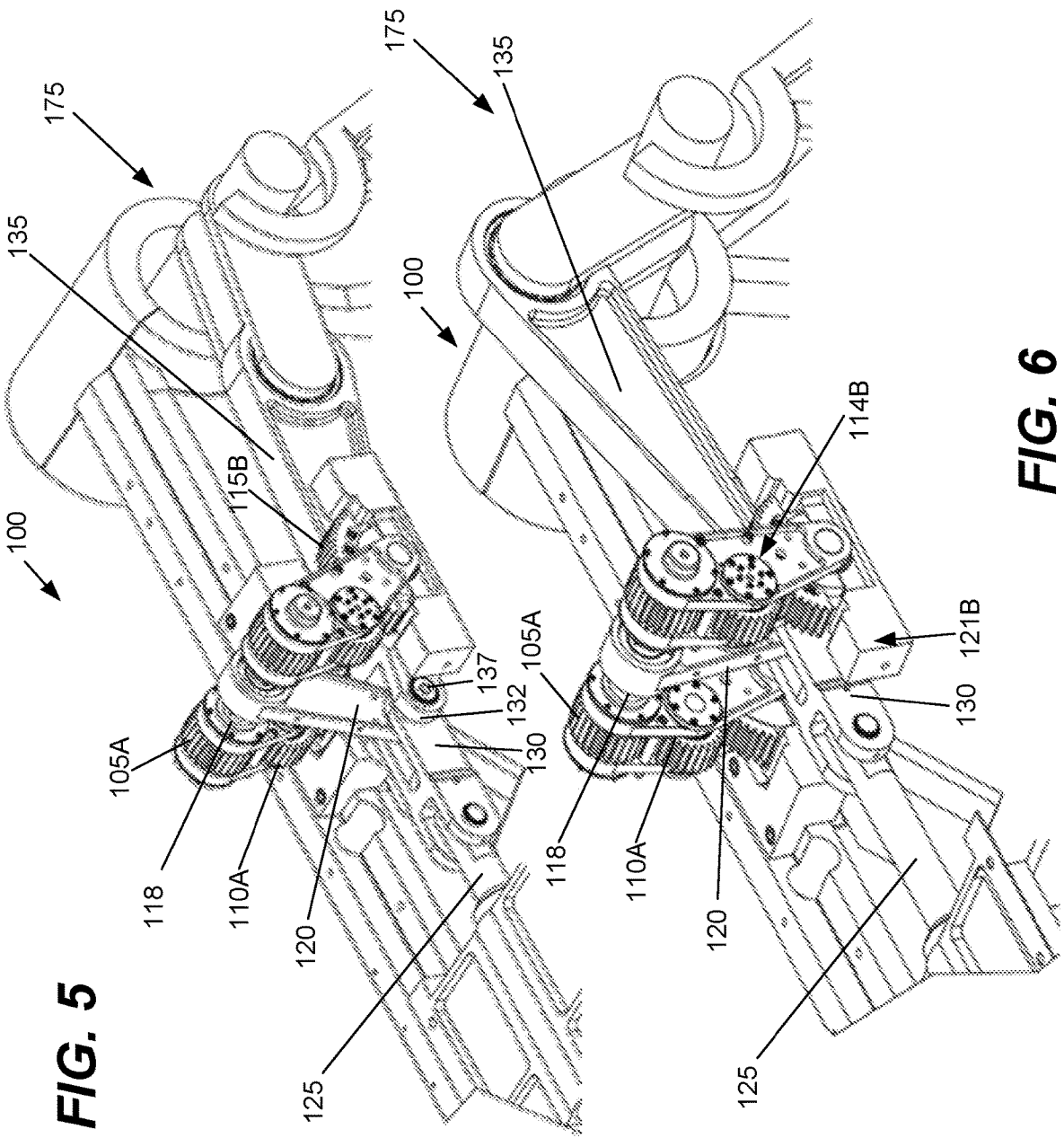

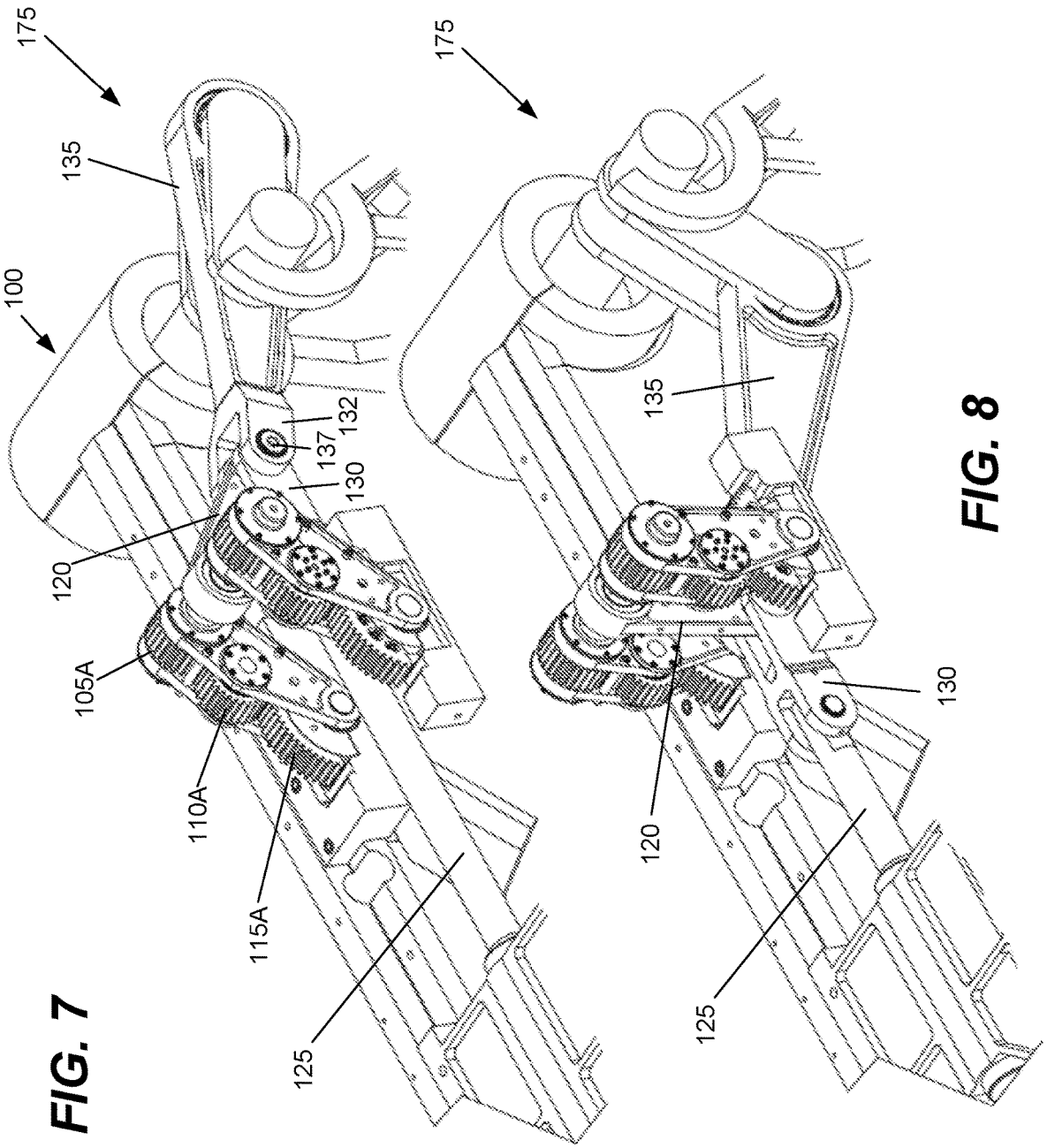

METHOD AND SYSTEM FOR CONVERTING ROTATING MOTION INTO LINEAR MOTION

DESCRIPTION OF THE RELATED ART

High speed manufacturing techniques often need machines which can translate one form of motion to another. For example, high speed manufacturing techniques often need to transfer/translate/transform rotating motion into linear motion and visa-versa.

In the past, such a transformation of rotating motion into linear motion was possible with a cardan-gear. The cardan-gear was invented by Girolamo Cardano in the 16th century. The cardan-gear is used to convert rotation motion to reciprocating linear motion without using linkages or slideways.

While the cardan-gear did provide some advantages in its day, its gear system is not well suited for high-speed, high-volume manufacturing environments. Its gear system is not well suited for high-speed manufacturing environments because its two rotating gears are often not stable at high revolutions per minute (RPMs), such as on the order of 500 RPMs and up. The two rotating gears often wear down quickly when the gears are being used 24 hours per day/7 days a week in high-volume manufacturing environments. Classical cardan-gear mechanisms are highly cantilevered (supported at one end only) and are thus subject to relatively large deflections during operation.

Exemplary manufacturing environments where making a product requires precise dimensioning/sizing for materials and that usually requires 24 hour per day production includes aluminum can manufacturing. Aluminum cans usually must be produced with very little variations in their wall thickness.

Typically an aluminum can must have less than 0.0002" wall variation in the lower two-thirds of the can to provide its column strength. Wall variation in the upper one-third of a can usually must be less than 0.0004" to ensure that the necking operation (reduce open diameter size for metal savings) does not fail or produce visual defects. Therefore, the forming punch to produce a can must be driven very accurately through the forming dies—i.e. in a straight line or horizontal.

After an aluminum can is formed and removed from a punch, the punch and ram must retract accurately through the forming dies. If the punch contacts the dies during the retract stroke then damage to the dies and punch may occur. This tooling damage will cause either wall variation, wall surface finish disruptions, or disrupt container strength during forming so that the forming operation fails and the metal of the can rips.

This failure in can production is typically called a "tear off." A tear off rate of 1 tear per 10,000 is considered so severe as it will usually require a can manufacturer to shut a production line down. One goal for a can manufacturer is typically 1 tear off per 100,000 cans. Exact/precise straight line motion is a key to minimizing tooling damage and thus sustaining an acceptable tear off rate for can production.

The can manufacturing market in the United States is approximately 90 billion cans per year as of this writing. High machine speeds are thus required to fulfill market demands. A can bodymaker typically runs from 300 to 400 strokes per minute depending on can size. Those speeds require robust, lightweight drive systems. High reciprocating mass reduces machine speed and also reduces reliability.

What is needed in the art is a method and system for aluminum can production that has less mass than conventional machines. What is further needed in the art is a method and system for producing linear motion from reciprocating motion that uses less, such as on the order of one-half of, the links and bearings used in conventional systems. Thus, a method and system are needed that provide the technological base to increase can making speeds into the 400 to 500 stroke per minute range while maintaining or even increasing reliability.

And stated more broadly, what is needed in the art is a method and/or system for converting rotating motion into linear motion (and/or visa-versa) that is stable at high RPMs and is less prone to mechanical wear relative to the conventional cardan-gear.

SUMMARY OF THE INVENTION

A method and system for transforming rotating motion into linear motion may include a first gear; a first link coupled to the first gear; and a second link coupled to the first link and coupled to a means for receiving linear motion. The system may further include an arm coupled to the second link, where the arm is coupled to a means for producing rotating motion A second gear may be coupled to the first gear and to a third gear. Once rotation has started with the means for producing rotating motion, the third gear may remain stationary while the first and second gears rotate around the third gear and while the first link pivots and translates through space with the first gear. The second link may drive the means for receiving linear motion while the second link receives stabilizing supporting forces from the first link.

The third gear may comprise a partial segment of a ring-gear. The ring-gear may have gear teeth along its periphery that define a sector comprising an angle between about 90.0 degrees to about 200.0 degrees. The first gear, second gear, and third gear may be coupled to a plate.

A system for transforming rotating motion into linear motion may also comprise an output gear and an output link coupled to the output gear. A shared link may be coupled to the output link and coupled to a rod. An arm may be coupled to the shared link and to a rotating drive An idle gear coupled may be coupled to the output gear and to a stationary gear. Once rotation has started with the rotating drive, the output gear and idle gear may rotate around the stationary gear while the output link pivots and translates through space with the output gear. The shared link may drive the rod in a linear direction while receiving stabilizing supporting forces from the output link.

The rod may be coupled to the shared link by a pin. And the rotating drive may comprise a circular shaped member coupled to the arm. The rotating drive may also comprise a motor.

Meanwhile, the intermediate link may be coupled to the output link with a pin. The pin may also couple the intermediate link to the arm. The output link may translate within a space defined by walls of the shared link during movement of the system.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 1 is a side view of one exemplary embodiment of a system for converting rotating motion into linear motion;

FIG. 2 is a top view of the system for converting rotating motion into linear motion illustrated in FIG. 1;

FIG. 5 is a side, perspective view of the system for converting rotating motion into linear motion as illustrated in FIG. 1 in which the linear drive shaft of the system is in a fully extended position the two primary rotating gears 105, 110 relative to the stationary gear 115 are at a maximum displacement position relative to the rotating motion generating means.

FIG. 6 is a side, perspective view of the system for converting rotating motion into linear motion as illustrated in FIG. 1 in which the linear drive shaft of the system is in a mid-stroke position and the two primary rotating gears relative to the stationary gear are at a mid-point displacement position and having movement direction towards the rotating motion generating means;

FIG. 7 is a side, perspective view of the system for converting rotating motion into linear motion as illustrated in FIG. 1 in which the linear drive shaft of the system is in a maximum retracted position and the two primary rotating gears relative to the stationary ring gear are at a maximum retracted position relative to the rotating motion generating means;

FIG. 8 is a side, perspective view of the system for converting rotating motion into linear motion as illustrated in FIG. 1 in which the linear drive shaft of the system is in a mid-stroke position and the two primary rotating gears relative to the stationary ring gear are a mid-point displacement position and having a movement direction away the rotating motion generating means;

DETAILED DESCRIPTION

Figure 3:
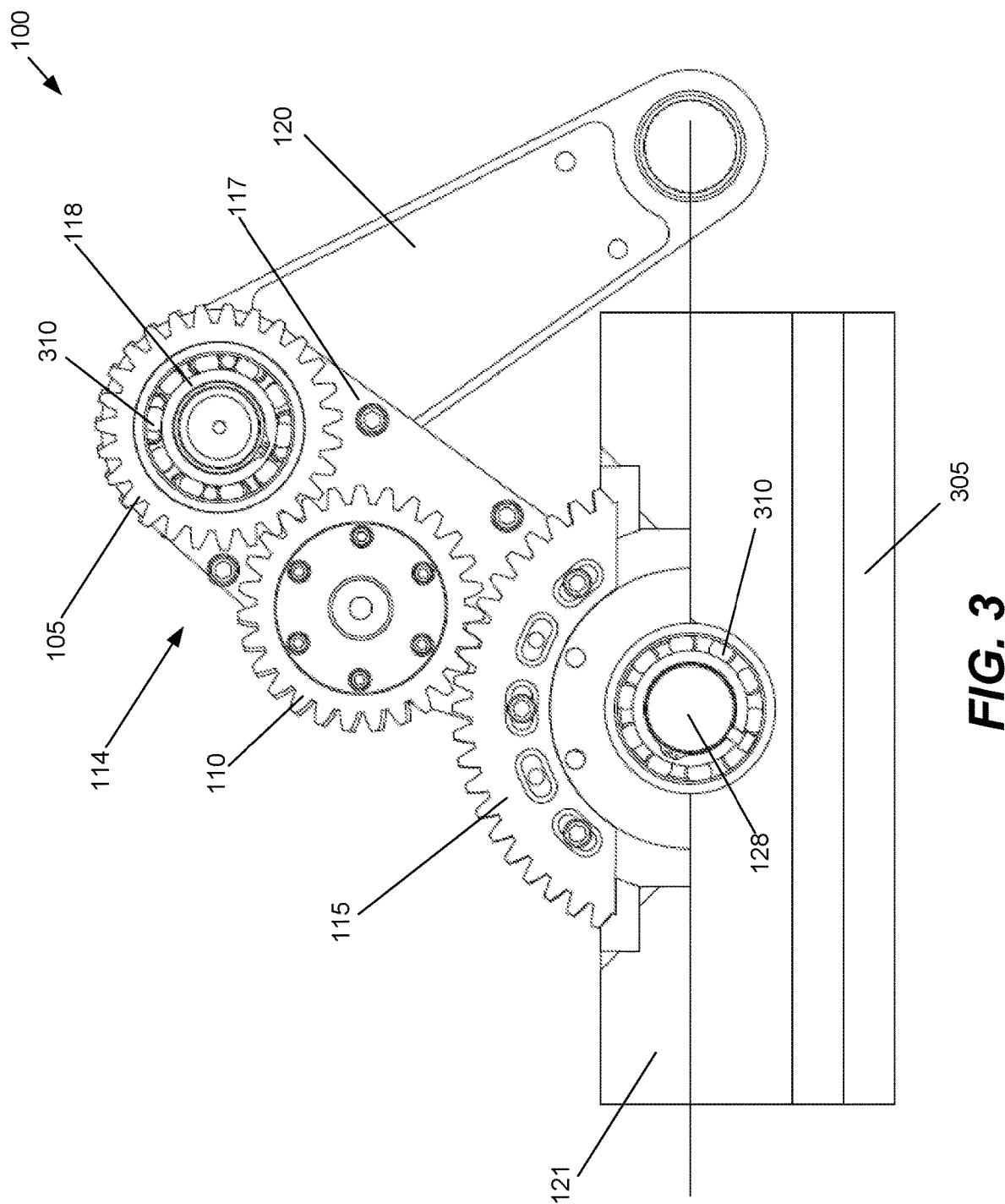
FIG. 3 is a close-up, side view of three primary gears of the system for converting rotating motion into linear motion as illustrated in FIG. 1.

The word "exemplary" is used herein to mean "serving as an example, instance, or illustration." Any aspect described herein as "exemplary" is not necessarily to be construed as exclusive, preferred or advantageous over other aspects.

Referring now to FIG. 1, this figure is a side view of one exemplary embodiment of a system 100 for converting rotating motion into linear motion. The system 100 may comprise at least three gears: an output gear 105, an idle gear 110, and ring gear 115. The output gear 105 may be coupled to a shaft 118 (See FIG. 2). The shaft 118 may be coupled to an output link 120 (see FIG. 4).

Figure 4:
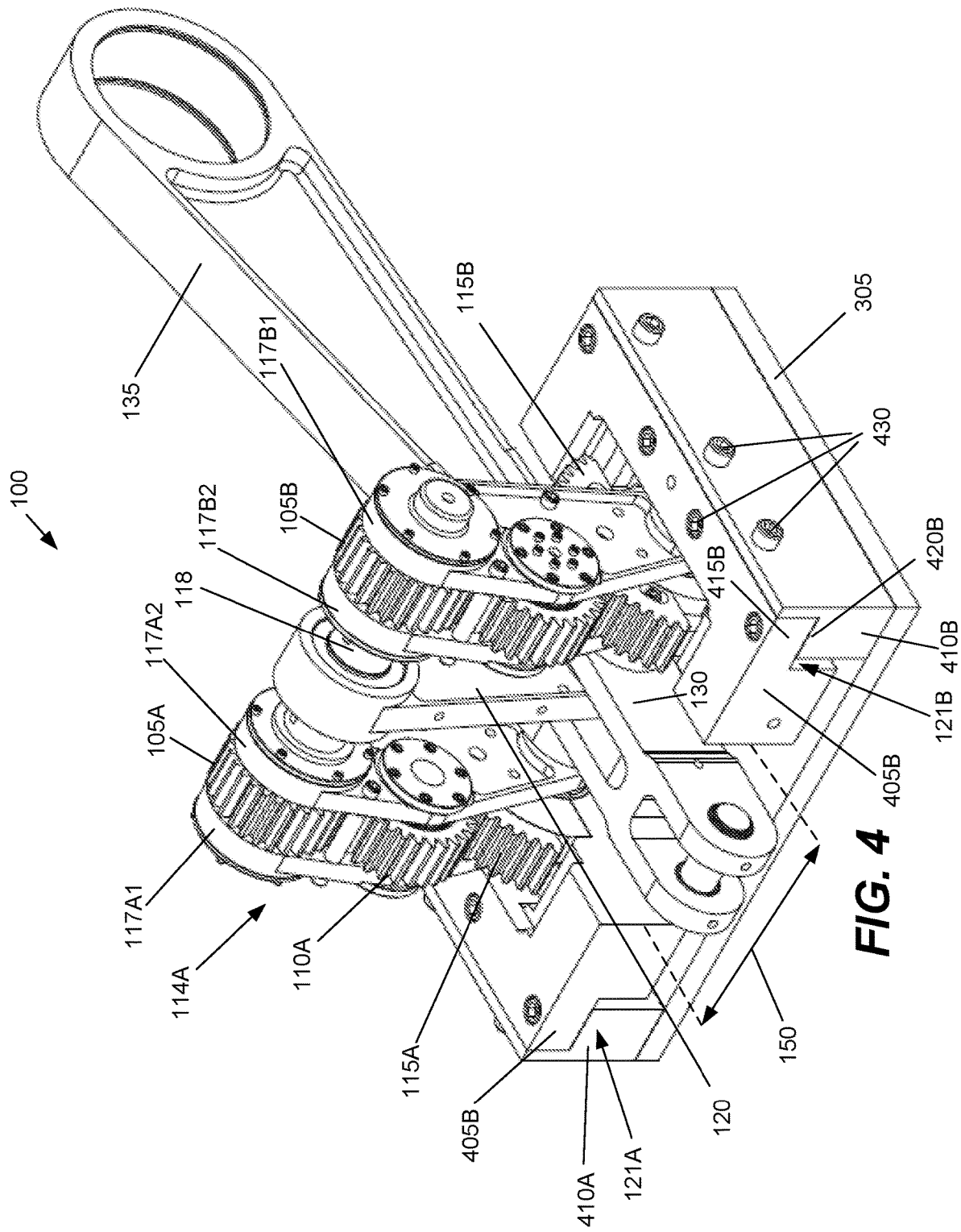
FIG. 4 is a side, perspective view of the system for converting rotating motion into linear motion as illustrated in FIG. 1.

The output link 120 (See FIG. 4.) may be coupled to an intermediate link 130 (See FIG. 4 and FIG. 1). Again referring to FIG. 1, the intermediate link 130 may be coupled to rod 125. The rod 125 may form or it may be part of a means/system for generating or receiving linear motion.

The intermediate link 130 of FIG. 1 may also be coupled to a connecting arm 135. The intermediate link 130 may be coupled to the connecting arm 135 via an end portion 132 of the connecting arm (See FIG. 5) which may comprise link that is also coupled to output link 120. The connecting arm 135 may form or may be part of a means 175 for generating or receiving rotating motion.

Referring again to FIG. 1, a first pivot shaft sub assembly 114 is shown. The first pivot shaft sub assembly 114 may contain and hold the three gears 105, 110, and 115 together. Specifically, a first end of the first pivot shaft sub assembly 114 is coupled to the non-rotating ring gear 115. A second end of the first pivot shaft sub assembly 114 is coupled to the rotating output gear 105.

The pivot shaft sub assembly 114 may comprise at least two plates 11761, B2 (See FIG. 2). The two plates 117 of the pivot shaft sub assembly 114 encapsulate/envelope the three gears 105, 110, and 115 and keep them together. The plates 117 along with the two rotating gears 105 and 110 move about/translate around the non-rotating ring gear 115.

The pivot shaft sub assembly 114 along with the three gears 105, 110, 115 and the corresponding shaft 118, output link 120, intermediate link 130, and connecting arm 135 may transform rotating motion originating from a means 175 for generating rotating motion into linear motion that is received by rod 125.

The means 175 for generating rotating motion may comprise a circular gear or shaft that is coupled to a motor or any other type of device which may create rotational movement. The rotating generating means 175 may be coupled to the connecting arm 135. The connecting arm 135 is coupled to the intermediate link 130 at a first end and to the rotating generating means 175 at a second end.

The non-rotating ring gear 115 and the pivot shaft sub assembly 114 may be coupled to a stationary pivot block holder assembly 121. The pivot block holder assembly 121 keeps the non-rotating ring gear 115 stationary while allowing the pivot shaft sub assembly 114 to translate/move around the non-rotating ring-gear 115. As illustrated in FIG. 1, the non-rotating ring gear 115 may comprise a partial gear. In the exemplary embodiment illustrated, the non-rotating ring gear 115 may comprise approximately one-half of or at least about one-hundred twenty (120) degrees of a circular gear from which the intermediate gear 110 and output gear 105 rotate.

Referring now to FIG. 2, this figure illustrates a top view of the system 100 for converting rotating motion into linear motion illustrated in FIG. 1. In this figure, two sets of gear assemblies are illustrated. The first set of gears or first gear assembly (designated with the letters "A") may comprise a first set of the three gears 105A, 110A, 115A described above. Similarly, a second set of gears or second gear assembly (designated with the letters "B") may comprise a second set of the three gears 105B, 110B, and 115B as described above.

The first set of gears (A) and second set of gears (B) may comprise mirror-opposite/substantially equivalent/symmetrical assemblies relative to each other. Each gear set may have two plates 117 that form the pivot shaft subassembly 114. Each gear set may also have its own pivot block holder assembly 121. The two pivot block holder assemblies 121 may be coupled together by a solid plate 305 (not illustrated in FIGS. 1-2 but See FIGS. 3-4).

The two sets of gear assemblies (A) and (B) remove cantilever loads and increase stability of the system 100, especially in high-speed manufacturing environments in which RPMs are significantly high (such as on the order of about 500.0-RPM and up) and in which the system 100 is operated 24 hours per day, and from several days a week to a schedule of everyday operation until routine and/or scheduled maintenance is to occur.

The two sets of gear assemblies (A) and (B) allow the output shaft 118, output link 120, intermediate link 130, rod 125, and connecting arm 135 to translate/move through a channel/space 150. The channel 150 is designated by a double-headed arrow as illustrated in FIG. 2 and FIG. 4. The channel 150 may be formed by the two pivot block holder assemblies 121A, 121B.

Referring now to FIG. 3, this figure is a close-up, side view of three primary gears 105, 110, 115 of the system 100 for converting rotating motion into linear motion as illustrated in FIG. 1. As noted previously, the three gears 105, 110, 115 may be supported by a plate 117 that allows rotation of the idle gear 110, and output gear 105 around the stationary ring gear 115. The stationary ring gear 115 may be coupled to the pivot block holder assembly 121.

Also noted previously, the output gear 105 is also coupled to a shaft 118 that supports an output link 120. The output link 120 is coupled both to an intermediate link 130 (not visible in FIG. 3 but see FIG. 2 described above) that provides linear motion and an end portion 132 of connecting arm 135 (not visible in FIG. 3 but see FIG. 5 described below) that provides rotating motion.

The pivot block holder assembly 121 may be coupled to a plate 305 that couples a first pivot block holder assembly 121A to a second pivot block holder assembly 121B (see FIG. 2 described above). FIG. 3 further illustrates ball bearings 310 which are positioned between the output gear 105 and the output shaft 118 so that the output gear 105 may smoothly rotate relative to the output shaft 118. Similarly, ball bearings 310 may be positioned between a shaft 128 and the stationary pivot block holder assembly 121 so that the shaft 128 coupled to the plate 117 may smoothly rotate relative to the stationary pivot block holder assembly 121.

While ball bearings 310 are illustrated, other bearings may be employed without departing from the scope of this disclosure. Other bearings include, but are not limited to, plain bearings (that include bushings, journal bearings, sleeve bearings, rifle bearings, and composite bearings); jewel bearings; fluid bearings; magnetic bearings; and flexure bearings, and the like.

According to the exemplary embodiment illustrated in FIG. 3, the base plate may comprise a width dimension (extending left to right on the page for a landscape orientation) of about 60.0 centimeters and a height of about 10.0 centimeters. The stationary ring gear 115 may have a radius with a magnitude of about 25.0 centimeters when measured from the center of shaft 128 supported by the pivot block 121. The output gear 105, in most embodiments, usually must have a diameter of about one-half (½) that of the ring gear 115. The diameter and position of the idle gear 110 is usually chosen so that a gear 110 of a size between the ring gear 115 and output gear 105 is placed in mesh with gears 115 and 105. One of ordinary skill in the art recognizes that other dimensions, smaller or larger, may be employed without departing from the scope of this disclosure as understood by one of ordinary skill in the art.

FIG. 4 is a side, perspective view of the system 100 for converting rotating motion into linear motion as illustrated in FIG. 1. In this figure, the output shaft 118 and output link 120 are more visible. Further, the dual, stable nature of the system 100 is more apparent with the dual output gears 105A, 105B, dual idle gears 110A, 110B, and dual ring gears 115A, 115B. The gears 105, 110 on each side/on each pivot block assembly 121 are supported by the pairs of two plates 117A1, 117A2 and 117B1, 117B2. For most embodiments, All plates 117 usually must have the equal end bores center to center dimensions and they usually must also have the same end bores center to center dimension as the output link 120.

Further mechanical/structural details of each pivot block holder assembly 121 as well as the support plate 305 are visible in FIG. 4. Each pivot block holder assembly 121 may comprise at least two parts: a first block 405 and a second block 410. The first block 405 may mate with the second block 410 such as through a tongue 415B and groove 420B system as illustrated. However, other mechanical arrangements for the pivot block holder assembly 121 are possible and are within the scope of this disclosure as understood by one of ordinary skill in the art. The first blocks 405 and second blocks 410 may be coupled together by fasteners 430. Fasteners 430 may comprise screws but other fasteners are possible and are included within the scope of this disclosure. Other fasteners 430 include, but are not limited to, rivets, nails, welds, adhesives, and the like.

FIG. 5 is a side, perspective view of the system 100 for converting rotating motion into linear motion as illustrated in FIG. 1 in which the linear drive shaft 125 of the system 100 is in a fully extended position and the two primary gears 105, 110 relative to the stationary gear 115 are at a maximum displacement position relative to the rotating motion generating means 175. According to this exemplary embodiment, the fully extended position of the linear drive shaft 125 happens to be to the far left side of the page relative to the rotating motion generating means 175 found on the far right side of the page.

In this exemplary embodiment of FIG. 5, the link 130 [coupled to the end portion 132 of the rotating connecting arm 135 and to the output link 120] is also at its maximum distance from the pivot block holder assemblies 121. The intermediate link 130 may be coupled to the output link 120 and the end portion 132 via a pin 137 which translates in a linear manner during movement.

The output link 120, at this stage of motion in this moving system 100, is at its maximum displacement position and closest to the left side of the system 100. The output link 120, at this stage of motion, has been rotated between about 15.0 and 30.0 degrees in a clock-wise direction Both the output link 120 and Pivot shaft subassembly 114 rotate the angle but in opposite directions about the shaft 118 relative to the exemplary embodiment illustrated in FIG. 6 described below.

Referring now to FIG. 6, this figure is a side, perspective view of the system 100 for converting rotating motion into linear motion as illustrated in FIG. 1 in which the linear drive shaft 125 of the system is in a mid-stroke position and the 105, 110 relative to the stationary gear 115 are at a mid-point displacement position and having movement direction towards the rotating motion generating means 175. FIG. 6 is similar to FIG. 5, however, the linear drive shaft 125 and rotating arm 135 and primary rotating gears 110 have been displaced in a right-side/right-wad direction relative to the page and relative to the embodiment illustrated in FIG. 5.

In this exemplary embodiment of FIG. 6, the link 130 [coupled to the end portion 132 of the rotating connecting arm 135 and to the output link 120] is now entering the space/channel 150 defined by the pivot block holder assemblies 121A, 121B. The output link 120, at this stage of motion in this moving system 100, is in a parallel alignment with the pivot shaft subassemblies 114. The output link 120, at this stage of motion, has been rotated between about 15.0 and 30.0 degrees in a counter-clockwise direction about the shaft 118 relative to the exemplary embodiment illustrated in FIG. 5 described above.

Comparing the rotating arm 135 of the exemplary embodiment of FIG. 6 to the exemplary embodiment of FIG. 5, it is seen that in FIG. 6 that the rotating connecting arm 135 has moved in a right-ward/clock-wise direction relative to FIG. 5. The rotating connecting arm 135 in FIG. 6 is at a slight angle compared to the fully extended-straight position of the rotating connecting arm found in FIG. 5.

Referring now to FIG. 7, this figure is a side, perspective view of the system 100 for converting rotating motion into linear motion as illustrated in FIG. 1 in which the linear drive shaft 125 of the system 100 is in a maximum retracted position and the two rotating primary gears 105, 110 relative to the stationary ring gear 115 are at a maximum retracted position relative to the rotating motion generating means 175. In other words, the two rotating primary gears 105, 110 and linear drive shaft 125 have been displaced on the right side of the page and closest to the rotating motion generating means 175.

According to this exemplary embodiment, the fully retracted position [relative to the extended position of FIG. 5] of the linear drive shaft 125 happens to be on the far right side of the page relative to the rotating motion generating means 175 that is also found on the far right side of the page. In this exemplary embodiment of FIG. 7, the link 130 [coupled to the end portion 132 of the rotating connecting arm 135 and to the output link 120 via pin 137] is also at its maximum distance from the pivot block holder assemblies 121 [but now on the right side relative to the left side as illustrated in FIG. 5].

The output link 120, at this stage of motion in this moving system 100, is at its maximum retracted position and closest to the right side of the system 100. The output link 120, at this stage of motion, has been rotated between about 15.0 and 30.0 degrees in a counter-clock-wise direction about the shaft 118 relative to the exemplary embodiment illustrated in FIG. 6 described above.

Comparing the rotating arm 135 of the exemplary embodiment of FIG. 7 to the exemplary embodiment of FIG. 6, it is seen that in FIG. 6 that the rotating connecting arm 135 has moved even more in a right-ward/clock-wise direction relative to FIG. 6. The rotating connecting arm 135 in FIG. 6 still moving downward compared to the position of the arm 135 found in FIG. 5.

Referring now to FIG. 8, this figure is a side, perspective view of the system 100 for converting rotating motion into linear motion as illustrated in FIG. 1 in which the linear drive shaft 125 of the system is again in a mid-stroke position [compared to FIG. 6] and the two primary rotating gears relative to the stationary ring gear 115 are at a mid-point displacement position and having a movement direction away from the rotating motion generating means 175.

The exemplary embodiment illustrated in FIG. 8 is similar to the exemplary embodiment of FIG. 6. Therefore, only the differences between these two figures will now be described.

Comparing the rotating arm 135 of the exemplary embodiment of FIG. 8 to the exemplary embodiment of FIG. 6, it is seen that in FIG. 8 that the rotating connecting arm 135 has moved even more in a left-ward/clock-wise direction relative to FIG. 6. The rotating connecting arm 135 in FIG. 6 now moving upward from a low position compared to the higher position of the arm 135 found in FIG. 6 which is rotating in a right-ward/clock-wise direction [in that figure].

Figure 9:
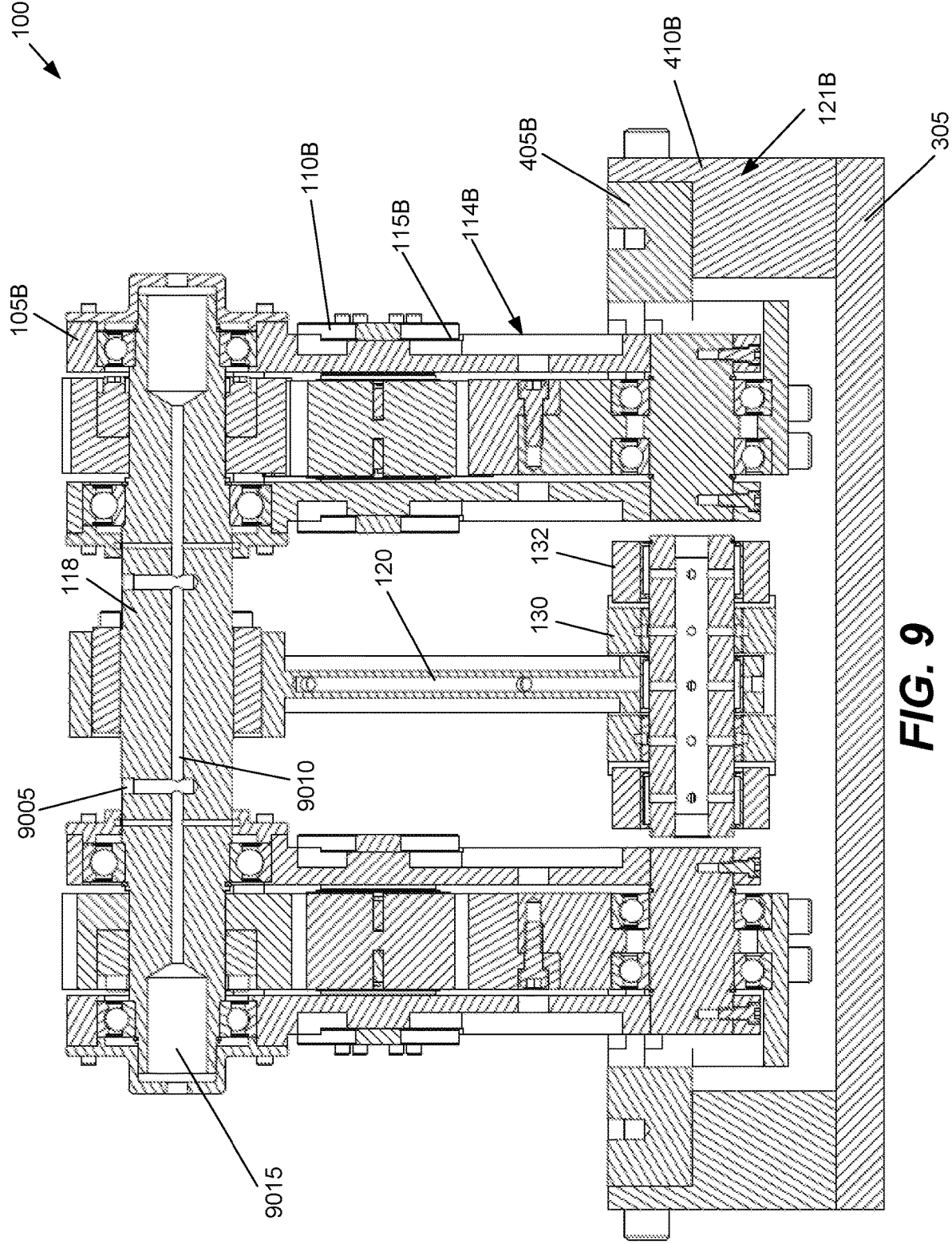
FIG. 9 is a cross-sectional view of the system for converting rotating motion into linear motion as illustrated in FIG. 1 taken along the section line a-a of FIG. 1.

FIG. 9 is a cross-sectional view of the system 100 for converting rotating motion into linear motion as illustrated in FIG. 1 taken along the section line a-a of FIG. 1. As shown in FIG. 1, this cross-sectional view taken along section line a-a which has arrows pointing towards the left side of the page in FIG. 1 means that in the view of FIG. 9 the rotating motion generating means 175 is in the background or is behind the parts which are shown in this view.

According to this cross-sectional view, the shaft 118 coupled to output gears 105 is visible and is further shown with fluid passage ways 9005, 9010, and 9015. These fluid passage ways 9005, 9010, 9015 may channel a lubricating fluid such as oil as understood by one of ordinary skill in the art.

Figure 10:
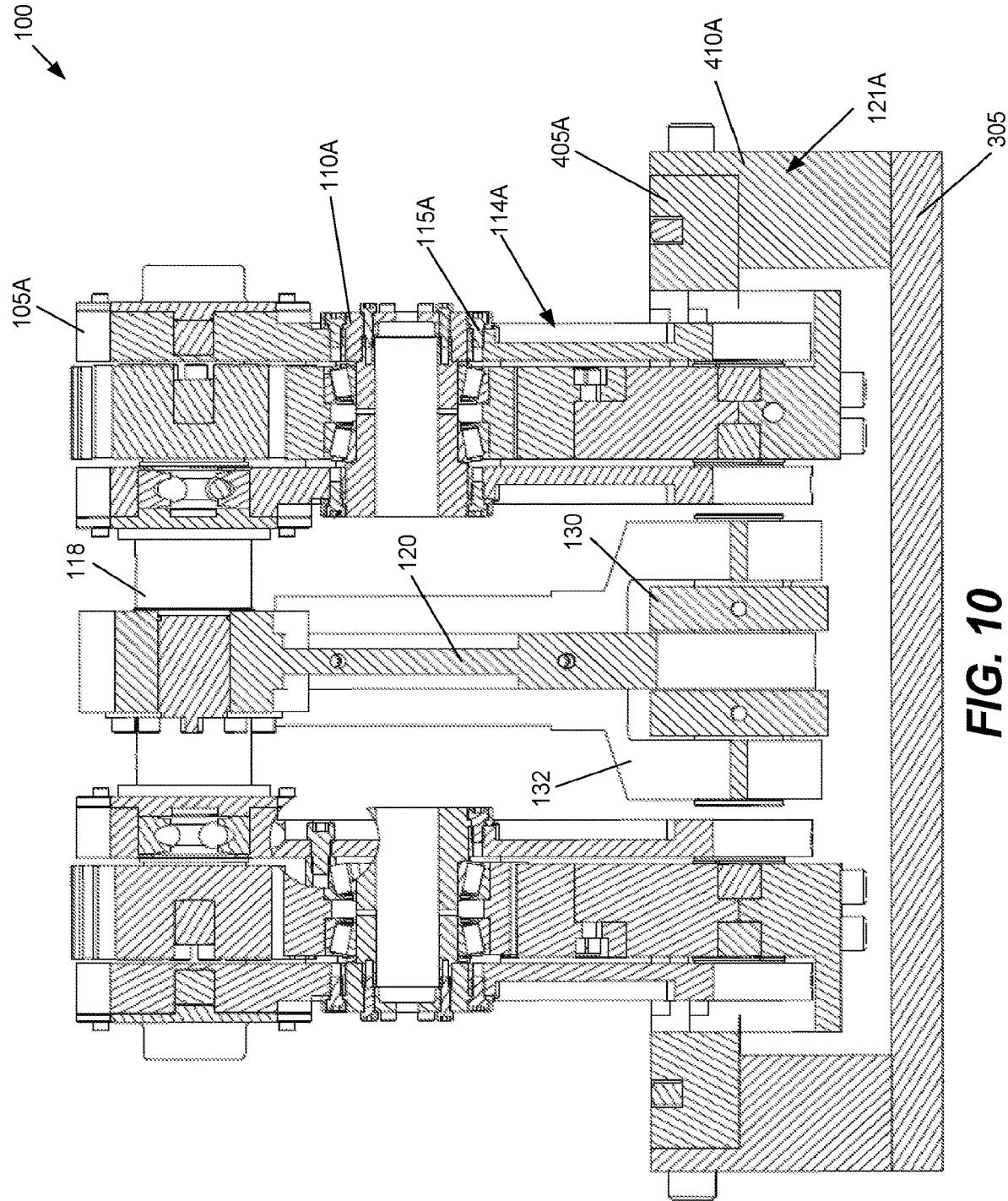
FIG. 10 is a cross-sectional view of the system for converting rotating motion into linear motion as illustrated in FIG. 1 taken along the section line b-b of FIG. 1.

Referring now to FIG. 10, this figure is a cross-sectional view of the system 100 for converting rotating motion into linear motion as illustrated in FIG. 1 taken along the section line b-b of FIG. 1. As shown in FIG. 1, this cross-sectional view taken along section line b-b which has arrows pointing towards the right side of the page in FIG. 1. In this view illustrated in FIG. 10, intermediate link 130 and end portion 132 of the connecting arm 135 as well as the output link 120 are visible in the center of the view.

Figure 11:
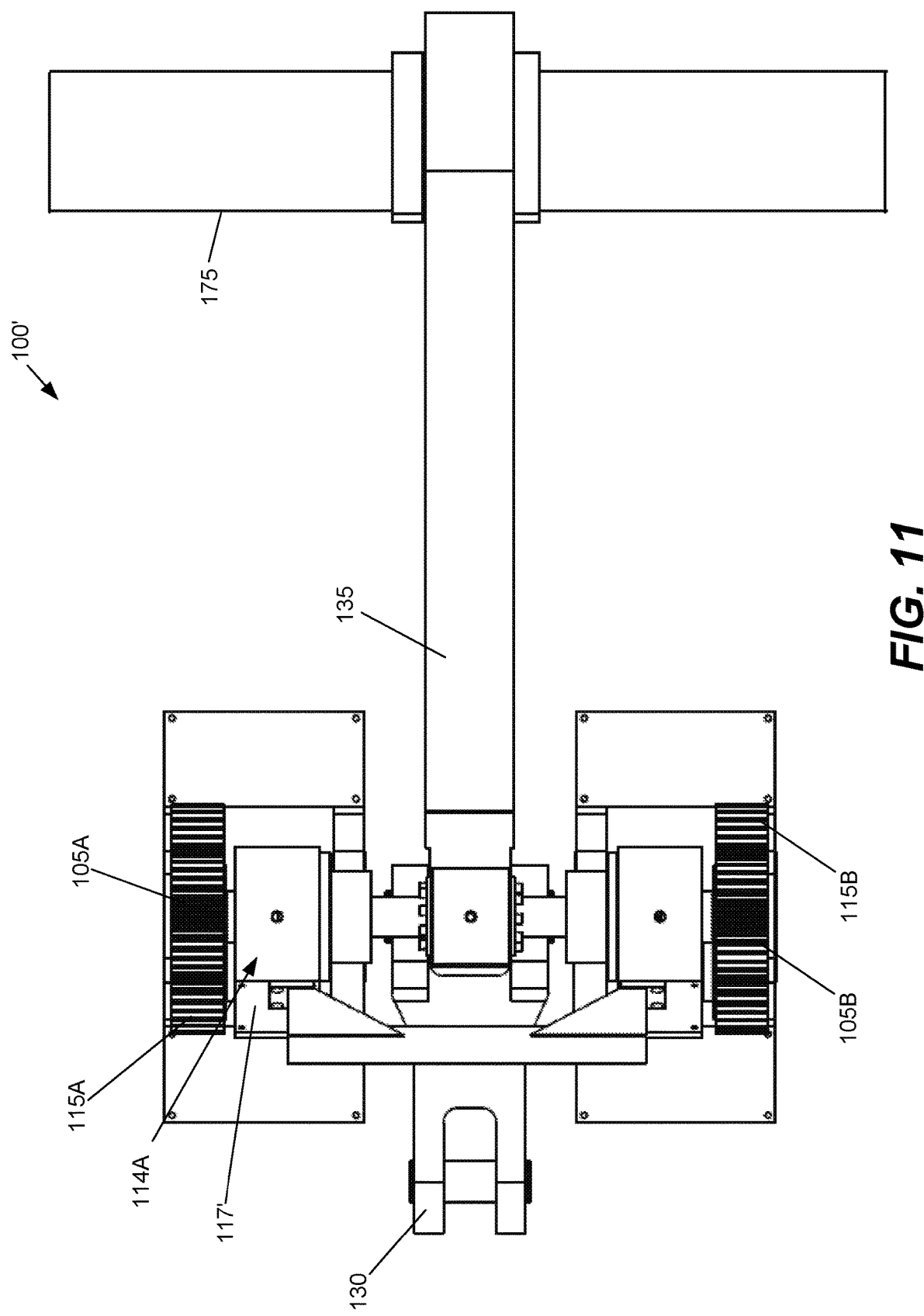
FIG. 11 is a top view of an alternate embodiment of the system for converting rotating motion into linear motion illustrated in FIG. 1.

FIG. 11 is a top view of an alternate embodiment of the system 100 for converting rotating motion into linear motion as illustrated in FIG. 1 and FIG. 2. Comparing the alternate embodiment of FIG. 11 to FIG. 2 (which is a top view of FIG. 1), the gears 105, 110, and 115 of the system 100' (prime) of FIG. 11 relative to those of FIG. 2 have been placed in an external position relative to the pivot shaft subassembly 114 which holds the two moving primary gears 105, 110. Further the pivot shaft subassembly 114 of system 100' does not comprise two plates 117—but instead a single plate 117' (prime).

Figure 12:
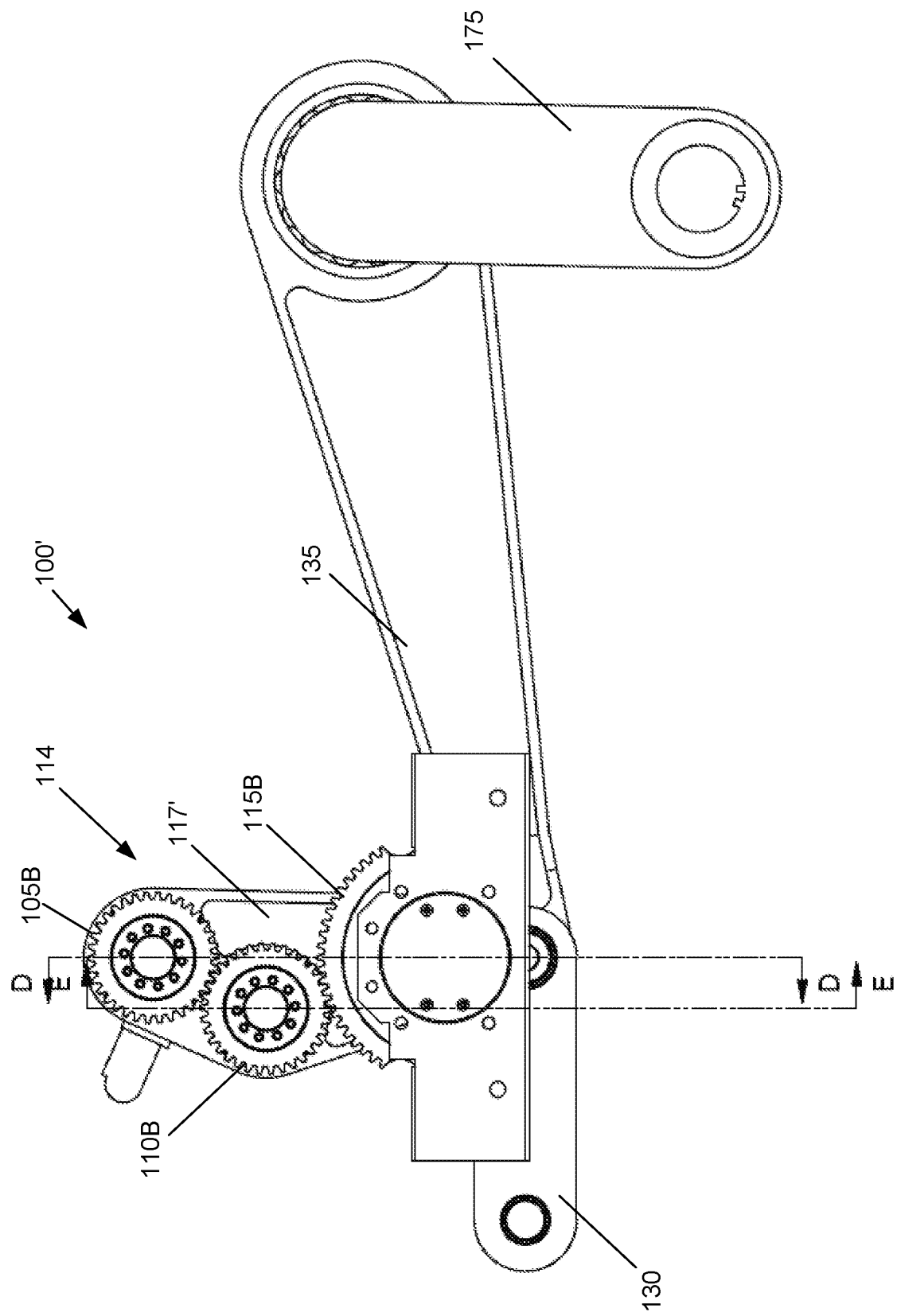
FIG. 12 is a side view of the alternate exemplary embodiment of the system for converting rotating motion into linear motion of FIG. 11.

FIG. 12 is a side view of the alternate exemplary embodiment of the system 100' (prime) for converting rotating motion into linear motion of FIG. 11. FIG. 12 illustrates further details of the two primary moving gears 105B, 1106 and the stationary ring gear 115B. As noted above with respect to FIG. 11, the pivot shaft subassembly 114 comprises a single plate 117' (prime) instead of two plates 11761, 11762 (visible in FIG. 2). FIG. 12 also provides cross-sectional cut lines D-D and E-E corresponding to the cross-sectional views of FIG. 13 (section E-E) and FIG. 14 (section D-D) described below.

Figure 13:
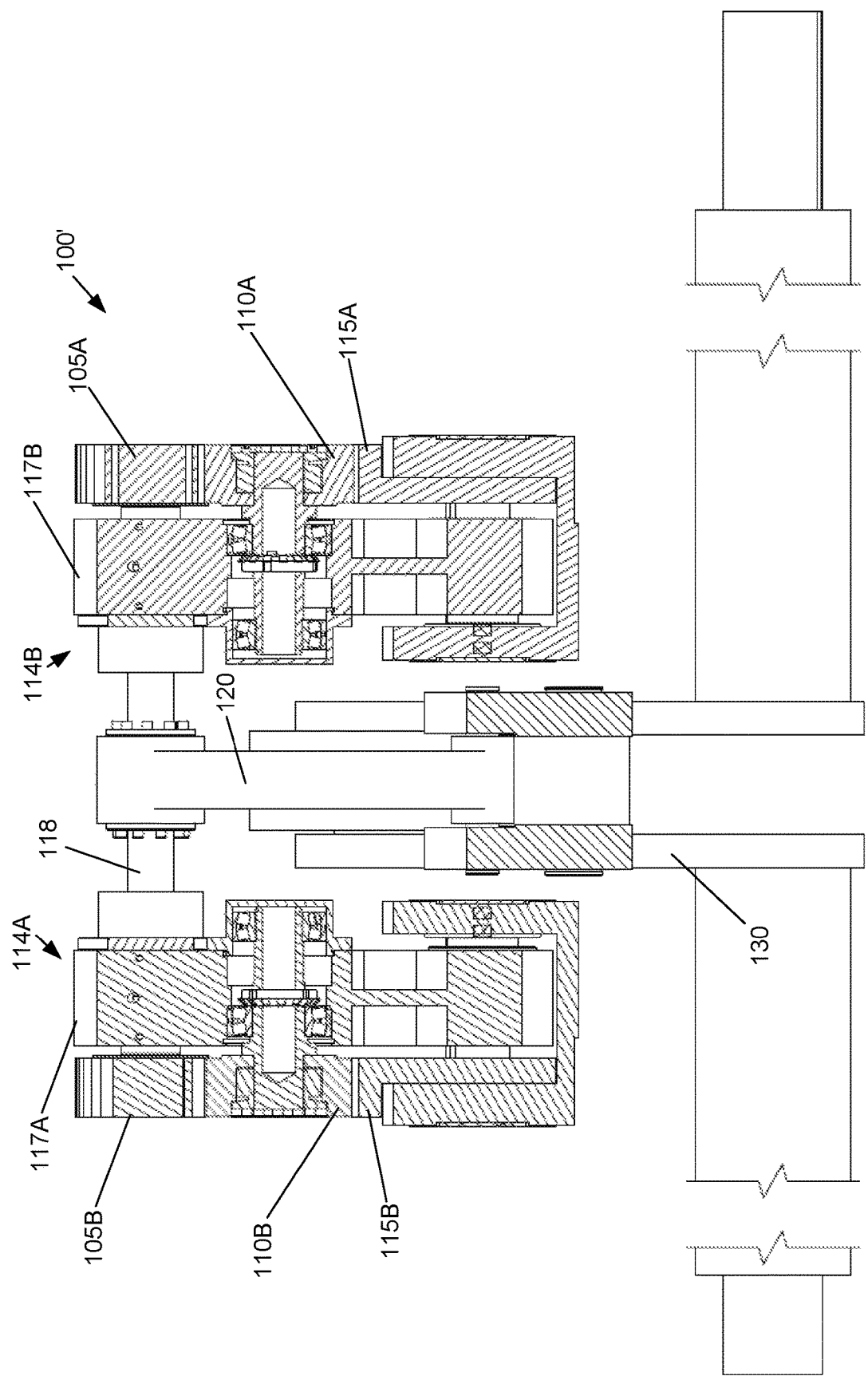
FIG. 13 is a cross-sectional view of the system for converting rotating motion into linear motion as illustrated in FIG. 12 taken along the section line E-E of FIG. 12.

FIG. 13 is a cross-sectional view of the system 100' (prime) for converting rotating motion into linear motion as illustrated in FIG. 12 taken along the section line E-E of FIG. 12. According to this view of FIG. 13 and the directional arrows of cut-line E-E pointing to the right side of the page in FIG. 12, the rod 125/means for receiving linear motion (not visible in this figure but see FIG. 1) is in the background of FIG. 13 relative to the elements presented (visible).

Further details of the single plate 117 for the pivot shaft subassembly 114 are visible in this view. As noted previously, relative to the exemplary embodiment illustrated in FIGS. 1-2, the exemplary embodiment illustrated in FIGS. 11-14 has its two primary moving gears 105, 110 and the stationary ring gear are positioned at outermost regions relative to the pivot shaft subassembly 114 and the output link 120.

Figure 14:
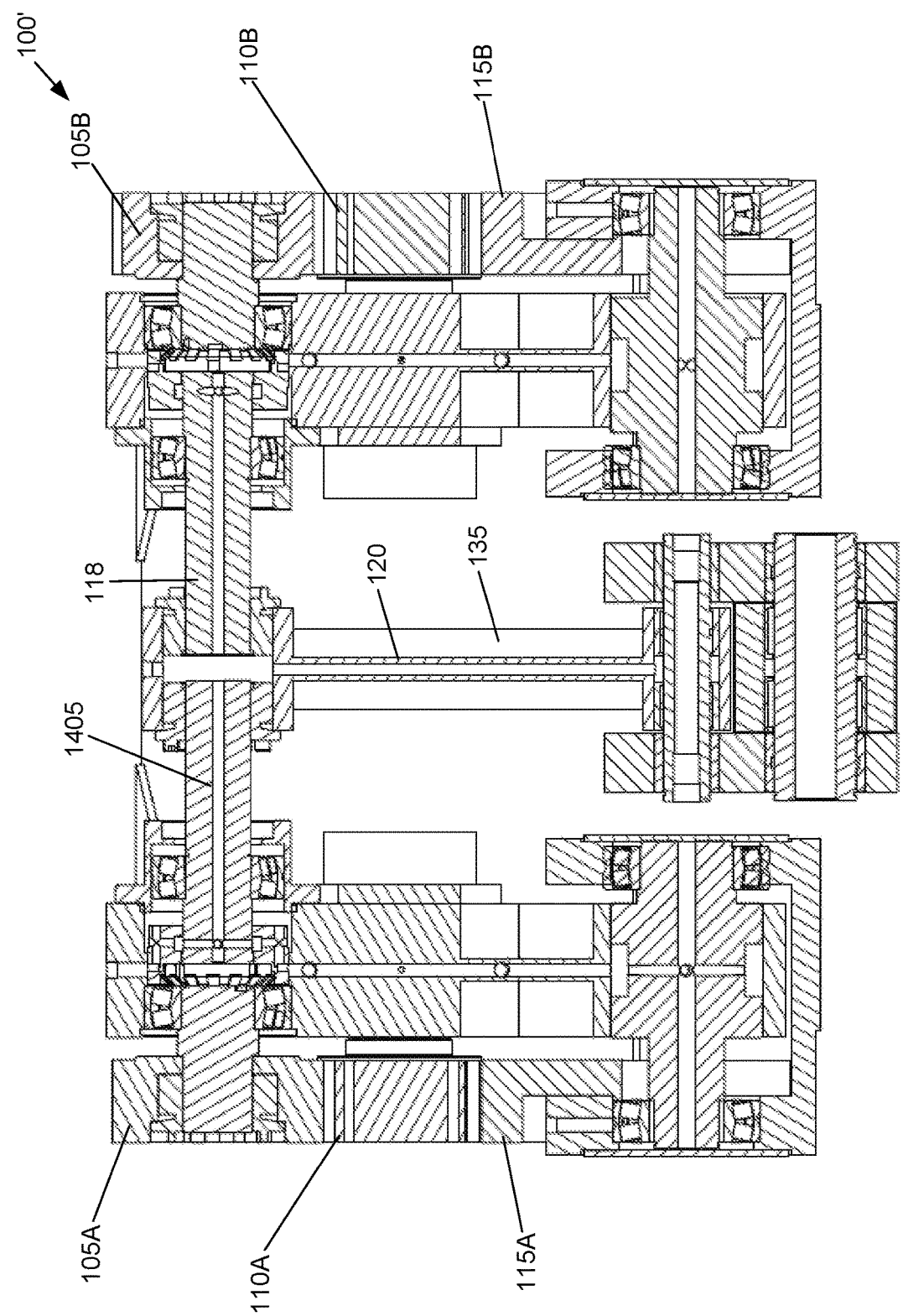
FIG. 14 is a cross-sectional view of the system for converting rotating motion into linear motion as illustrated in FIG. 12 taken along the section line D-D of FIG. 12.

Referring now to FIG. 14, this figure is a cross-sectional view of the system 100' (prime) for converting rotating motion into linear motion as illustrated in FIG. 12 taken along the section line D-D of FIG. 12. According to this view and the directional arrows of the cut-line D-D pointing to the left side of the page in FIG. 12, the connecting arm 135 and means for generating rotating motion 175 is in the background of FIG. 14 relative to the elements presented (visible).

According to the view in FIG. 14, an exemplary fluid passage way 1405 of the rotating shaft 118 that is coupled to the output gears 105. Like the fluid passage ways 9005, 9010, 9015 of FIG. 9, the fluid passage way 1405 of FIG. 14 may channel a lubricating fluid such as oil as understood by one of ordinary skill in the art.

Figure 15:
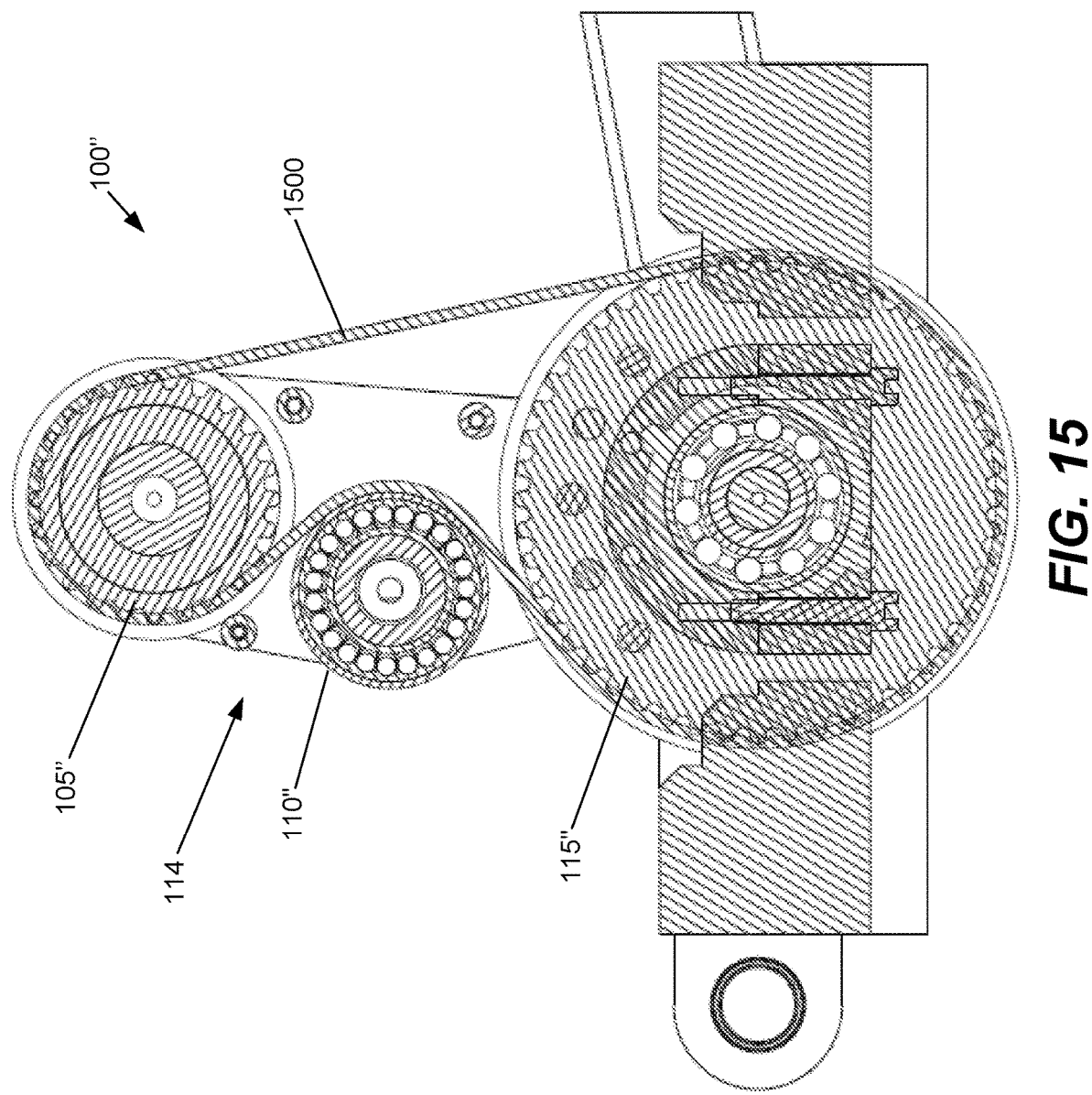
FIG. 15 is a side view of the alternate exemplary embodiment of the system for converting rotating motion into linear motion illustrated in FIG. 1.

Referring now to FIG. 15, this figure is a side view of the alternate exemplary embodiment of the system 100 for converting rotating motion into linear motion illustrated in FIG. 1. The system 100'' (double-prime) of FIG. 15 relative to the system 100 of FIG. 1 has a chain 1500 that moves around a first large gear 115'' (double-prime) and a second smaller gear 105'' (double-prime).

The chain 1500 receives a force from a roller/idler pulley 110'' (double-prime) that is positioned between the first gear 115'' and the second gear 105''. This force keeps tension along the chain 1500. The pitch diameter of second gear 105'' usually must be about one-half (½) the pitch diameter of first gear 115''. While the first gear 115'' and second gear 105'' are depicted as gears with teeth, it is possible to operate the invention such that the first gear 115'' and second gear 105'' are substituted with toothed pulleys which engage a toothed belt instead of a chain 1500. Other alternatives/substitutions for all the mechanical elements illustrated are possible and are included within the scope of this disclosure as understood by one of ordinary skill in the art.

Figure 16:
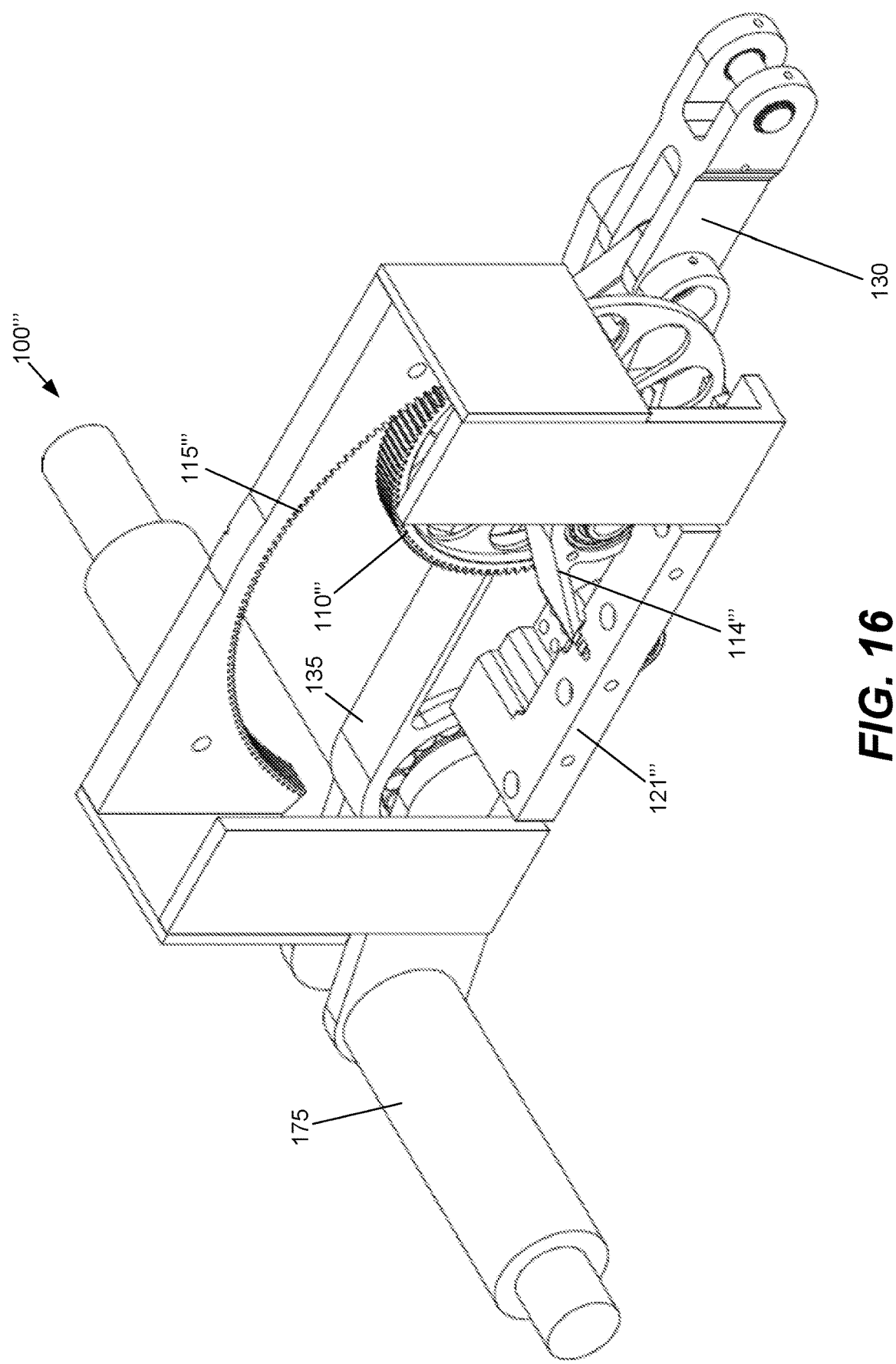
FIG. 16 is a perspective view of the alternate exemplary embodiment of the system for converting rotating motion into linear motion illustrated in FIG. 1.

Referring now to FIG. 16, this figure is a perspective view of the alternate exemplary embodiment of the system 100 for converting rotating motion into linear motion illustrated in FIG. 1. According to this exemplary system 100''' (triple-prime) of FIG. 16, the system 100''' comprises a single ring gear 115''' (triple-prime) that engages a rotating gear 110''' (triple-prime).

The rotating gear 110''' is coupled to a movable plate 114''' (triple-prime) that contains a bearing that supports the rotating gear 110'''. The movable plate 114''' is coupled to a stationary pivot block holder assembly 121'''(triple-prime). The pitch diameter of rotating gear 110''' usually must be about (½) of single ring gear 115'''. The center to center bore distance of movable plate 114''' usually must be about one-fourth (¼) of the size of the single ring gear 115'''.

Figure 17:
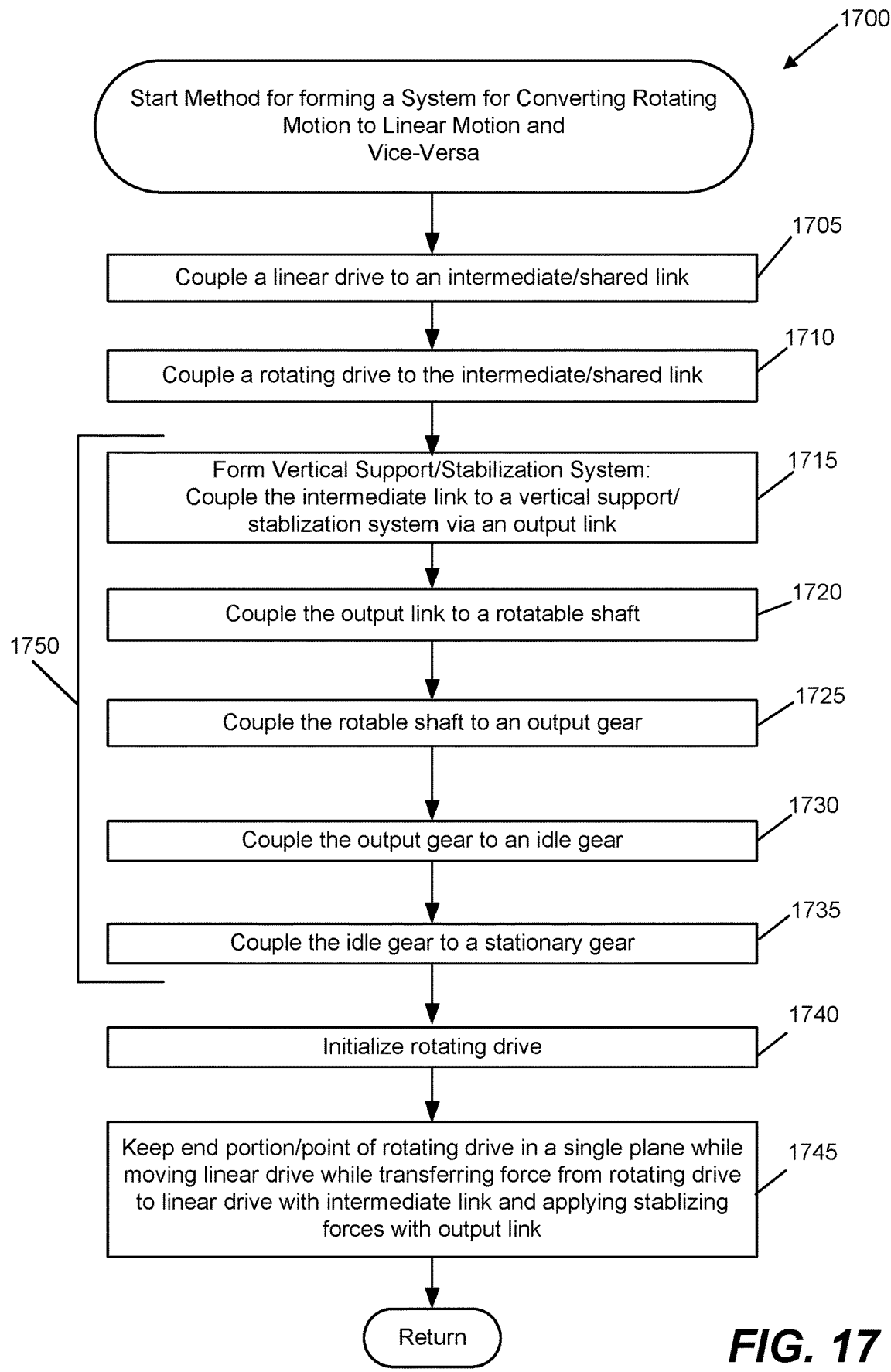
FIG. 17 illustrates a flow chart of a method for forming a system for converting rotating motion to linear motion according to one exemplary embodiment.

Referring now to FIG. 17, this figure illustrates a flow chart for a method 1700 for forming a system 100 for converting rotating motion to linear motion according to one exemplary embodiment. This method 1700 generally corresponds with the exemplary embodiment illustrated in FIGS. 1-10. If certain steps are modified and/or removed, then this method 1700 may also apply to the exemplary embodiments (alternate systems 100', 100'', 100''') illustrated in FIGS. 11-16.

Step 1705 is the first step of method 1700 for converting rotating motion to linear motion, and vice versa. In step 1705, a linear drive or means for receiving or generating linear motion 125 as illustrated in FIG. 1 may be coupled to an intermediate/shared link 130. Next, in step 1710, a rotating drive or means for generating rotating motion or means for receiving rotating motion 175 may be coupled to the intermediate link via a connecting arm 135.

Subsequently, in block 1715, a vertical support/stabilization system may be formed with block 1715 being the first step of forming the support/stabilization system. In other words, the intermediate/shared link 130 described above in connection with steps 1705 and 1710 may be coupled to a vertical support/stabilization system via an output link 120.

As part of forming the vertical support/stabilization system, in block 1720, the output link 120 may be coupled to a rotatable output shaft 118. Next, in step 1725, the rotatable shaft 118 may be coupled to an output gear 105.

Subsequently, in step 1730, the output gear 105 may be coupled to an idle gear 110. The idle gear 110 in block 1735 may be coupled to a stationary gear. Steps 1715-1735 have been designated with reference character 1750 to denote that these steps form the vertical support/stabilization system for the conversion of rotating motion into linear motion and vice versa.

Referring now to step 1740, in this step, the rotating drive or means for producing rotating motion 175 may be initialized. In other words, the rotating drive 175 may begin to produce rotating motion. However one of ordinary skill the art recognizes that if the linear drive 125 was driven by a motor or some other external force [for converting linear motion to rotating motion], then the linear drive 125 driven by a motor (not illustrated) could begin motion at step 1740 such that linear motion would eventually be converted to rotating motion upon the rotating drive 175, or more appropriately, the means for receiving rotating motion 175.

Referring back to step 1740, after this step, in step 1745, the end portion or a point such as coupling pin or rod 137 that couples the end portion of connecting arm 135 to intermediate/shared link 130 and output link 120 [visible in FIGS. 5 and 7] may be kept/maintained in a single plane while moving the linear drive 125 and while transferring force from the rotating drive 175 to the linear drive 125. This maintaining/keeping of the coupling pin or rod 137 in the same plane may be accomplished with the intermediate link 130 and the output link 120. The output link 120 may apply stabilizing forces to the coupling pin or rod 137 which in turn applies stabilizing forces to both the linear drive 125 and the rotating drive 175.

One of ordinary skill in the art recognizes that the steps of method 1700 suggest how the system 100 of FIGS. 1-10 may be formed while also describing how the system 100 may be used. Method 1700 generally describes the motion and forces of the system 100 after the system 100 has been assembled. It is quite evident that the parts and elements of system 100 may be assembled in a different sequence of steps than those proposed as illustrated in method 1700. However, once the system 100 is formed, the general motion and forces described in method 1700 are generally applicable as understood by one of ordinary skill the art.

Certain steps in the processes or process flows of FIG. 17 as well as processes and flows illustrated/suggested by the mechanical drawings of FIGS. 1-16 in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention.

As noted previously, for the exemplary embodiments illustrated in FIGS. 11-16, it is recognized that some steps of method 1700 may be eliminated and/or changed. For example, in the exemplary embodiment of system 100" (double-prime) illustrated in FIG. 15, the idle gear 110 has been replaced with a pulley 110" that does not mesh with either gear 115" or gear 105" and a chain/belt 1500 has been added. So the steps of method 1700 which address stationary gear 115 would need to be modified. Similarly, for the exemplary embodiment of the system 100''' (triple-prime) illustrated in FIG. 16, the intermediate gear 110 has been eliminated. Therefore, the steps of method 1700 which address the intermediate gear 110 would have to be eliminated and/or changed.

Further, it is recognized that the materials for the parts illustrated in the several figures described above, such as the gears, rods, arms, and links may be made of metal, such as steel. Other metals may be employed without departing from the scope of this disclosure. Other metals include, but are not limited to, aluminum, bronze, copper, tin, lead, and alloys/combinations thereof. Further, other materials besides metals are also possible and are included within the scope of this disclosure. Other materials besides metals include, but are not limited to, polymers (i.e. plastics), ceramics, composite materials, and any combination thereof.

Although a few embodiments have been described in detail above, those skilled in the art will readily appreciate that many modifications are possible in the embodiments without materially departing from this disclosure. Accordingly, such modifications are intended to be included within the scope of this disclosure as defined in the following claims.

For example, while three main gears have been illustrated in the several views that included the output gear 105, the idle gear 110, the ring gear 115, it is possible that the functions/movement of these elements could be replaced/substituted by additional and/or fewer structures. For example, the function/movement of the output gear 105 could be replaced by additional smaller gears or less gears (such as illustrated in FIG. 16) as understood by one of ordinary skill in the art. Further, mechanical equivalents of the gears and linkages illustrated—like belts, chains, sprockets, and/or pulleys—could be substituted for many of the structures illustrated in the several views as understood by one of ordinary skill in the art. Such substitutions of mechanical equivalent structures are included within the scope of this disclosure.

In the can making industry, the system 100 may be used to drive a ram instead of a rod 125. The ram may comprise a highly accurate cylindrical part of controlled diameter that mounts a tool steel or carbide forming tool on the end to the left. This tool is then driven through cylindrical dies to form the can walls.

Alternatively, rod 125 could be replaced with a mechanism that could pick up a component and place it in an exact position by releasing the component at the end of the stroke. The rod 125 could also be replaced with a cutting apparatus and thus could cut glass, metal, plastic, or other materials in an exact straight line over long distances at high rates of speed. Other applications beyond these alternatives are possible and are included within the scope of this disclosure as understood by one of ordinary skill in the art.

Similarly, in the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, sixth paragraph for any limitations of any of the claims herein, except for those in which the claim expressly uses the words 'means for' together with an associated function.

Therefore, although selected aspects have been illustrated and described in detail, it will be understood that various substitutions and alterations may be made therein without departing from the spirit and scope of the present invention, as defined by the following claims.

What is claimed is:

1. A system for transforming rotating motion into linear motion comprising:
a first gear;
a first link coupled to a first gear;
a second link coupled to the first link and coupled to a means for receiving linear motion;
an arm having a first end and a second end, the first end of the arm coupled to the second link, the second end of the arm directly coupled to a means for producing rotating motion, the means for producing rotating motion comprises a motor, the motor defining an axis of rotation for the rotating motion, the second end of the arm rotating around the axis of rotation; and
a second gear coupled to the first gear and to a third gear; once rotation of the arm has started with the means for producing rotating motion, the third gear being stationary while the first and second gears rotate around the third gear and while the first link pivots and translates through space with the first gear, the second link driving the means for receiving linear motion while receiving stabilizing supporting forces from the first link.

2. The system of claim 1, wherein the third gear comprises a partial ring-gear.

3. The system of claim 2, wherein the ring-gear has gear teeth along its periphery that define a sector comprising an angle between about 90.0 degrees to about 200.0 degrees.

4. The system of claim 1, wherein the first gear, second gear, and third gear are coupled to a plate.

5. The system of claim 4, wherein the first gear, second gear, third gear, and plate define a first subassembly, the system further comprising a second subassembly.

6. The system of claim 1, wherein the means for receiving linear motion comprises a rod.

7. The system of claim 1, wherein the second link is coupled to the first link with a pin, the pin also coupling the second link to the arm.

8. The system of claim 1, wherein the first link is coupled to the first gear via a shaft which is rotatable.

9. A system for transforming rotating motion into linear motion comprising:
   an output gear;
   an output link coupled to the output gear;
   a shared link coupled to the output link and coupled to a rod;
   an arm having a first end and a second end, the first end of the arm coupled to the shared link, the second end of the arm directly coupled to a rotating drive that produces rotating motion, the rotating drive defining an axis of rotation for the rotating motion, the second end of the arm rotating around the axis of rotation; and
   an idle gear coupled to the output gear and to a stationary gear; once rotation of the arm has started with the rotating drive, the output gear and idle gear rotate around the stationary gear while the output link pivots and translates through space with the output gear, the shared link driving the rod in a linear direction while receiving stabilizing supporting forces from the output link.

10. The system of claim 9, wherein the stationary gear comprises a partial a ring-gear.

11. The system of claim 10, wherein the stationary has gear teeth along its periphery that define a sector comprising an angle between about 90.0 degrees to about 200.0 degrees.

12. The system of claim 9, wherein the output gear, idle gear, and stationary gear are coupled to a plate.

13. The system of claim 12, wherein the output gear, idle gear, and stationary gear and plate define a first subassembly, the system further comprising a second subassembly.

14. The system of claim 9, wherein the rod is coupled to the shared link by a pin.

15. The system of claim 9, wherein the rotating drive comprises a circular shaped member coupled to the arm.

16. The system of claim 9, wherein the rotating drive comprises a motor.

17. The system of claim 9, wherein the intermediate link is coupled to the output link with a pin, the pin also coupling intermediate link to the arm.

18. The system of claim 9, wherein the output link is coupled to the output gear via a shaft which is rotatable.

19. The system of claim 9, wherein the output link translates within a space defined by walls of the shared link during movement.

20. The system of claim 1, wherein the system is used for producing hollow containers.

21. The system of claim 20, wherein the hollow containers comprise cans.

22. The system of claim 9, wherein the system produces containers.

23. The system of claim 22, wherein the containers comprise cans.

* * * * *